United States Patent
Ding et al.

(10) Patent No.: US 11,263,803 B2
(45) Date of Patent: Mar. 1, 2022

(54) VIRTUAL REALITY SCENE RENDERING METHOD, APPARATUS AND DEVICE

(71) Applicants: BEIJING BOE OPTOELECTRONICS TECHNOLOGY CO., LTD., Beijing (CN); BOE Technology Group Co., Ltd., Beijing (CN)

(72) Inventors: Yadong Ding, Beijing (CN); Jian Sun, Beijing (CN); Ziqiang Guo, Beijing (CN); Lin Lin, Beijing (CN); Feng Zi, Beijing (CN); Bingxin Liu, Beijing (CN); Jiyang Shao, Beijing (CN); Yakun Wang, Beijing (CN); Binhua Sun, Beijing (CN)

(73) Assignees: BEIJING BOE OPTOELECTRONICS TECHNOLOGY CO., LTD., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/764,401

(22) PCT Filed: Dec. 12, 2019

(86) PCT No.: PCT/CN2019/124860
§ 371 (c)(1),
(2) Date: May 15, 2020

(87) PCT Pub. No.: WO2020/140720
PCT Pub. Date: Jul. 9, 2020

(65) Prior Publication Data
US 2021/0225064 A1    Jul. 22, 2021

(30) Foreign Application Priority Data
Jan. 2, 2019 (CN) .......................... 201910001295.7

(51) Int. Cl.
*G06T 15/20* (2011.01)
*G06T 7/73* (2017.01)
(Continued)

(52) U.S. Cl.
CPC .............. *G06T 15/20* (2013.01); *G06F 3/013* (2013.01); *G06T 7/73* (2017.01); *G06T 19/006* (2013.01)

(58) Field of Classification Search
CPC combination set(s) only.
See application file for complete search history.

(56) References Cited

U.S. PATENT DOCUMENTS 6,791,549 B2    9/2004 Hubrecht et al.
10,109,039 B1*  10/2018 Ray ...................... G06T 15/503
(Continued)

FOREIGN PATENT DOCUMENTS

CN    103164541 A    6/2013
CN    103858095 A    6/2014
(Continued)

OTHER PUBLICATIONS

Xu Li, Research on synchronization strategy of multichannel 3D scene rendering, Journal of Beijing Information Science & Technology University, Aug. 2015, pp. 27-30, 45, vol. 30, No. 4.
(Continued)

*Primary Examiner* — Motilewa Good Johnson
(74) *Attorney, Agent, or Firm* — Ling Wu; Stephen Yang; Ling and Yang Intellectual Property (57) ABSTRACT

The present disclosure provides a method, apparatus and device for rendering virtual reality scenes. The method includes: obtaining a virtual reality scene and determining whether the virtual reality scene is in a rendering idle state; if the virtual reality scene is in the rendering idle state, performing image rendering on the virtual reality scene to
(Continued)

generate a display image and store a correspondence between the display image and a display area; and obtaining a target area to be displayed of the virtual reality scene, calling a target display image corresponding to the target area according to the correspondence and displaying the target display image.

18 Claims, 5 Drawing Sheets

(51) Int. Cl.
*G06F 3/01* (2006.01)
*G06T 19/00* (2011.01)

(56) References Cited

U.S. PATENT DOCUMENTS

| | | | |
|---|---|---|---|
| 10,255,714 B2* | 4/2019 | Mitchell | G06F 3/012 |
| 10,859,840 B2* | 12/2020 | Dai | G06T 3/0093 |
| 2011/0273466 A1* | 11/2011 | Imai | G09G 3/003 |
| | | | 345/589 |
| 2015/0046520 A1 | 2/2015 | Chen et al. | |
| 2015/0287158 A1* | 10/2015 | Cerny | G06F 3/013 |
| | | | 345/553 |
| 2016/0078010 A1 | 3/2016 | Huang | |
| 2016/0191910 A1* | 6/2016 | von und zu Liechtenstein | |
| | | | G06F 3/013 |
| | | | 348/43 |
| 2018/0068640 A1* | 3/2018 | Martin | G06K 9/0061 |
| 2018/0136745 A1* | 5/2018 | Li | G06F 3/012 |
| 2018/0136746 A1* | 5/2018 | Yokotsuka | G06F 3/0659 |
| 2019/0043167 A1* | 2/2019 | Steyskal | G06T 3/0012 |
| 2020/0110271 A1* | 4/2020 | Komogortsev | G02B 27/017 |
| 2020/0174584 A1* | 6/2020 | Schliemann | G06F 3/017 |
| 2021/0027541 A1* | 1/2021 | Chao | G06F 3/013 |

FOREIGN PATENT DOCUMENTS

| | | |
|---|---|---|
| CN | 105472207 A | 4/2016 |
| CN | 105892683 A | 8/2016 |
| CN | 106652004 A | 5/2017 |
| CN | 106919360 A | 7/2017 |
| CN | 107145235 A | 9/2017 |
| CN | 107274472 A | 10/2017 |
| CN | 107317987 A | 11/2017 |
| CN | 107562212 A | 1/2018 |
| CN | 109741463 A | 5/2019 |
| WO | 03039698 A1 | 5/2003 |

OTHER PUBLICATIONS

International Search Report for PCT/CN2019/124860 dated Mar. 13, 2020.

Office Action dated Jun. 18, 2020 for Chinese Patent Application No. 201910001295.7 and English Translation.

* cited by examiner

VIRTUAL REALITY SCENE RENDERING METHOD, APPARATUS AND DEVICE

CROSS-REFERENCE TO RELATED APPLICATIONS

This application is a U.S. National Phase Entry of International Application No. PCT/CN2019/124860 having an international filing date of Dec. 12, 2019, which claims priority to and benefits of Chinese Patent Application No. 201910001295.7, filed with the State Intellectual Property Office of P. R. China on Jan. 2, 2019 by Beijing BOE Optoelectronics Technology Co., Ltd. and BOE Technology Group Co., Ltd., titled "Virtual Reality Scene Rendering Method, Apparatus and Device". The above-identified applications are incorporated by reference herein in their entirety.

TECHNICAL FIELD

The present disclosure relates to a field of virtual reality technology, and more particularly, to a method, an apparatus and a device for rendering virtual reality scenes.

BACKGROUND

As a simulation technology that can create and experience a virtual world, virtual reality technology has gradually become one of the research hotspots in the direction of human-computer interaction. With the development of virtual reality technology, users have higher requirements for authenticity and immersing sense of virtual reality.

Currently, one of the most important factors affecting the development of virtual reality is "dizziness", and the most fundamental reason for "dizziness" is that the virtual reality device has a long time delay, and there is an urgent need for a method of reducing the delay and the "dizziness".

SUMMARY

Accordingly, a first objective of the present disclosure is to provide a method for rendering a virtual reality scene. By rendering images in a rendering idle state and adopting a calling method during display, the problem of limiting a display refresh rate due to low GPU rendering refresh rate is solved, thereby improving the display refresh rate, and reducing the delay and the "dizziness" when using a virtual reality device.

A second objective of the present disclosure is to provide an apparatus for rendering a virtual reality scene.

A third objective of the present disclosure is to provide a virtual reality device.

A fourth objective of the present disclosure is to provide a computer readable storage medium.

In a first aspect, the embodiments of the present disclosure provide a method for rendering a virtual reality scene. The method includes:

obtaining a virtual reality scene and determining whether the virtual reality scene is in a rendering idle state;

if the virtual reality scene is in the rendering idle state, performing image rendering on the virtual reality scene to generate a display image and store a correspondence between the display image and a display area; and obtaining a target area to be displayed of the virtual reality scene, calling a target display image corresponding to the target area according to the correspondence and displaying the target display image.

With the method for rendering a virtual reality scene, a virtual reality scene is obtained and it is determined whether the virtual reality scene is in a rendering idle state, if the virtual reality scene is in the rendering idle state, image rendering is performed on the virtual reality scene to generate a display image and store a correspondence between the display image and a display area. Therefore, a target area to be displayed of the virtual reality scene is obtained, a target display image corresponding to the target area is called according to the correspondence and displayed. By rendering images in a rendering idle state and adopting a calling method during display, the problem of limiting a display refresh rate due to low GPU rendering refresh rate is solved, thereby improving the display refresh rate, and reducing the delay and the "dizziness" when using a virtual reality device. Moreover, while improving the display refresh rate, the authenticity of the image is ensured, and by calling the rendered display image, power consumption of the device is reduced, and the endurance of the device is improved.

Optionally, determining whether the virtual reality scene is in the rendering idle state, includes: determining whether the virtual reality scene is in a scene initialization state, and if the virtual reality scene is in the scene initialization state, determining that the virtual reality scene is in the rendering idle state; and performing image rendering on the virtual reality scene, includes: obtaining a gaze area in the virtual reality scene; and performing image rendering on the gaze area.

Optionally, the method further includes: obtaining a non-gaze area in the virtual reality scene; and performing image rendering on the non-gaze area in a preset order.

Optionally, determining whether the virtual reality scene is in the rendering idle state, includes: determining whether the virtual reality scene is in a scene display state and whether the image rendering of the gaze area has completed, and if the virtual reality scene is in the scene display state and the image rendering of the gaze area has completed, determining that the virtual reality scene is in the rendering idle state; and performing rendering on the virtual reality scene, includes: obtaining the non-gaze area in the virtual reality scene; and performing image rendering on the non-gaze area in the preset order.

Optionally, the method further includes: when a position of the gaze area changes, interrupting the image rendering operation, and obtaining a gaze area after change; and performing image rendering on the changed gaze area.

Optionally, performing image rendering on the virtual reality scene, includes: obtaining an area to be rendered, and determining whether image rendering of the area to be rendered has completed; and if image rendering of the area to be rendered has completed, determining a next area to be rendered according to the area to be rendered, and performing image rendering on the next area to be rendered.

Optionally, performing image rendering on the virtual reality scene to generate the display image and store the correspondence between the display image and the display area, includes: establishing a coordinate system according to the virtual reality scene, and segmenting the virtual reality scene into a plurality of display areas in the coordinate system; performing image rendering on the display areas to generate display images; and storing the display images and the correspondence between the display image and the display area.

In a second aspect, the embodiments of the present disclosure provide an apparatus for rendering a virtual reality scene. The apparatus includes:

a determining circuit, configured to obtain a virtual reality scene and determine whether the virtual reality scene is in a rendering idle state;

a processing circuit, configured to, if the virtual reality scene is in the rendering idle state, perform image rendering on the virtual reality scene to generate a display image and store a correspondence between the display image and a display area;

a displaying circuit, configured to obtain a target area to be displayed of the virtual reality scene, call a target display image corresponding to the target area according to the correspondence and display the target display image.

With the apparatus for rendering a virtual reality scene, a virtual reality scene is obtained and it is determined whether the virtual reality scene is in a rendering idle state, if the virtual reality scene is in the rendering idle state, image rendering is performed on the virtual reality scene to generate a display image and store a correspondence between the display image and a display area. Therefore, a target area to be displayed of the virtual reality scene is obtained, a target display image corresponding to the target area is called according to the correspondence and displayed. By rendering images in a rendering idle state and adopting a calling method during display, the problem of limiting a display refresh rate due to low GPU rendering refresh rate is solved, thereby improving the display refresh rate, and reducing the delay and the "dizziness" when using a virtual reality device. Moreover, while improving the display refresh rate, the authenticity of the image is ensured, and by calling the rendered display image, power consumption of the device is reduced, and the endurance of the device is improved.

Optionally, the determining circuit is further configured to: determine whether the virtual reality scene is in a scene initialization state, and if the virtual reality scene is in the scene initialization state, determine that the virtual reality scene is in the rendering idle state. The processing circuit is configured to: obtain a gaze area in the virtual reality scene; and perform image rendering on the gaze area.

Optionally, the processing circuit is configured to: obtain a non-gaze area in the virtual reality scene; and perform image rendering on the non-gaze area in a preset order.

Optionally, the determining circuit is configured to: determine whether the virtual reality scene is in a scene display state and whether the image rendering of the gaze area has completed, and if the virtual reality scene is in the scene display state and the image rendering of the gaze area has completed, determine that the virtual reality scene is in the rendering idle state. The processing circuit is configured to: obtain the non-gaze area in the virtual reality scene; and perform image rendering on the non-gaze area in the preset order.

Optionally, the apparatus further includes: an interrupting circuit, configured to, when a position of the gaze area changes, interrupt the image rendering operation, and obtain a gaze area after change; and perform image rendering on the changed gaze area.

Optionally, the processing circuit is configured to: obtain an area to be rendered, and determine whether image rendering of the area to be rendered has completed; and if image rendering of the area to be rendered has completed, determine a next area to be rendered according to the area to be rendered, and perform image rendering on the next area to be rendered.

In a third aspect, the embodiments of the present disclosure provide a virtual reality device including the apparatus for rendering a virtual reality scene according to embodiments of the second aspect.

In a fourth aspect, the embodiments of the present disclosure provide a computer-readable storage medium on which a computer program is stored, when the program is executed by a processor, the method for rendering a virtual reality scene according to embodiments of the first aspect is implemented.

Additional aspects and advantages of embodiments of the present disclosure will be given in part in the following descriptions, become apparent in part from the following descriptions, or be learned from the practice of the embodiments of the present disclosure.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A method, an apparatus and a device for rendering virtual reality scenes according to the embodiments of the present disclosure are described below with reference to the drawings.

Figure 1:
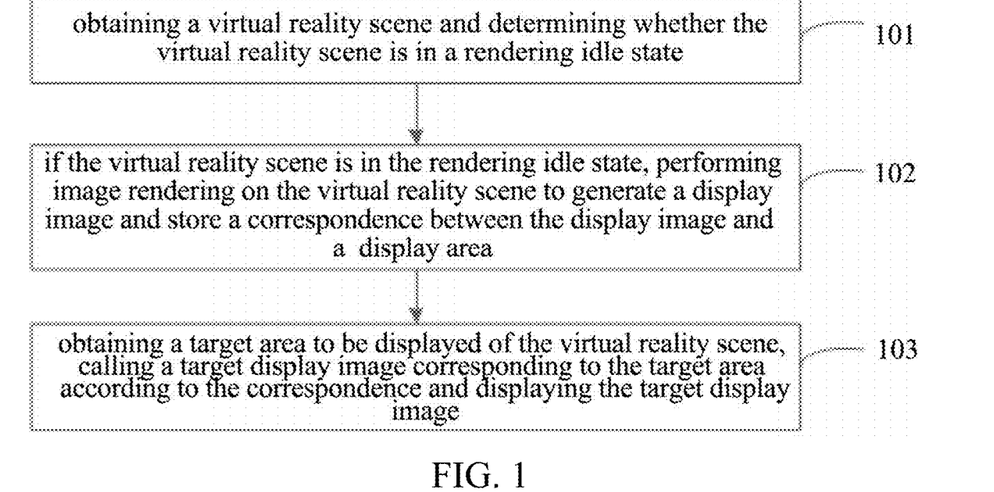
FIG. 1 is a flowchart of a method for rendering a virtual reality scene according to an embodiment of the present disclosure.

FIG. 1 is a flowchart of a method for rendering a virtual reality scene according to an embodiment of the present disclosure. As illustrated in FIG. 1, the method includes the following steps.

At step 101, a virtual reality scene is obtained and it is determined whether the virtual reality scene is in a rendering idle state.

In the embodiments, the virtual reality scene is obtained before displaying the virtual reality scene. For example, when performing medical diagnosis through a virtual reality scene, a selection instruction on the medical scene selected by a user is received, and a medical virtual reality scene is obtained according to the instruction. When teaching through a virtual reality scene, a selection instruction on an educational scene selected by a user is received, and an educational virtual reality scene may be obtained according to the instruction.

It is determined whether the virtual reality scene is in a rendering idle state, for example, whether the virtual reality device is in a rendering idle state is determined.

For example, it is determined whether the virtual reality scene is in a scene initialization state, and if the virtual reality scene is in the scene initialization state, it is determined that the virtual reality scene is in the rendering idle state.

Moreover, if it is known that the device is in a scene display state, for example, it is determined that the device is in the scene display state when the virtual reality device displays the virtual reality scene, and image rendering on a gaze area has completed, it is determined that the virtual reality scene is in the rendering idle state.

At step 102, if the virtual reality scene is in the rendering idle state, image rendering is performed on the virtual reality scene to generate a display image and store a correspondence between the display image and a display area.

As a possible implementation, according to the virtual reality scene that has been acquired, corresponding rendering information may be acquired to perform image rendering. For example, three-dimensional model information, three-dimensional animation definition information, and material information corresponding to a virtual reality scene can be acquired to perform image rendering on the virtual reality scene and generate the display image.

In some embodiments, image rendering is performed on the virtual reality scene according to different strategies to generate the display image and store the correspondence between the display image and the display area.

For example, partial areas in the virtual reality scene can be acquired, and image rendering is performed on the partial areas to generate display images corresponding to the partial areas.

Moreover, image rendering is performed on all areas of the virtual reality scene to generate display images. There are many ways to realize the correspondence between the display image and the display area. For example, a coordinate system can be established based on the virtual reality scene, and the virtual reality scene can be divided into a plurality of display areas in the coordinate system. Furthermore, after performing image rendering on a display area 1 to generate a display image 2, the display image 2 is stored, and a mapping table is generated and stored according to the correspondence between the display image 2 and the display area 1.

At step 103, a target area to be displayed of the virtual reality scene is obtained, a target display image corresponding to the target area is called according to the correspondence and displayed.

As an example, taking a virtual reality head-mounted display device as an example, position and posture information of the user's head can be detected by sensors such as gyroscopes and accelerometers, and the user's fixation point position in the virtual reality scene can be obtained. According to the fixation point position, a gaze area is determined, and then the target area to be displayed is determined according to the gaze area. Further, by querying the pre-stored correspondence between the display image and the display area, the corresponding target display image is obtained according to the target area, and the target display image is displayed. For example, the virtual reality scene includes display areas A and B, respectively corresponding to display images a and b, and it is known that the target area matches the display area A according to the position and posture information detected by the sensor, and then the corresponding display image a is obtained for display.

It is understood that the main reason for dizziness is long time delay. To reduce the dizziness, the delay needs to be reduced, and increasing frame rate is the main method to reduce the delay. In the related art, real-time image rendering is performed by a Graphics Processing Unit (GPU) when displaying a virtual reality scene. Due to limited rendering capability of the GPU, low rendering refresh rate of the GPU limits the display refresh rate during real-time rendering by the GPU, resulting in a low display refresh rate and a low frame rate.

In the embodiments, by rendering the image in advance in the rendering idle state and calling the image during display, the problem of limiting the display refresh rate due to the low GPU rendering refresh rate during real-time rendering by the GPU is solved, thereby improving the display refresh rate, reducing the delay and reducing the user's dizziness when using VR devices.

Further, in the related art, there are also ways to insert a fake frame or call an image of the previous frame plus an offset for display to increase the frame rate, for example, a GPU rendering refresh rate of 30 to 40 Hz is much smaller relative to a display refresh rate of 60 to 120 Hz. The frame rate is increased by inserting a fake frame or calling the previous frame image plus an offset to display, but the image authenticity is low and the obtained image is not the exact image to be displayed at the time. Compared with the way of inserting a fake frame or calling the previous frame image plus an offset for display, the method for rendering the virtual reality scene according to the embodiments of the present disclosure improves the display refresh rate while ensuring the authenticity of the image, and reduce the power consumption of the device, by calling the display image after rendering.

With the method for rendering a virtual reality scene, a virtual reality scene is obtained and it is determined whether the virtual reality scene is in a rendering idle state, if the virtual reality scene is in the rendering idle state, image rendering is performed on the virtual reality scene to generate a display image and store a correspondence between the display image and a display area. Therefore, a target area to be displayed of the virtual reality scene is obtained, a target display image corresponding to the target area is called according to the correspondence and displayed. By rendering images in a rendering idle state and adopting a calling method during display, the problem of limiting the display refresh rate due to the low GPU rendering refresh rate during real-time rendering by the GPU is solved, thereby improving the display refresh rate, reducing the delay and reducing the user's dizziness when using VR devices. Moreover, while improving the display refresh rate, the authenticity of the image is ensured, and by calling the rendered display image, the power consumption of the device is reduced, and the endurance of the device is improved.

Based on the above embodiments, the method for rendering a virtual reality scene is described by taking scene initialization as an example.

Figure 2:
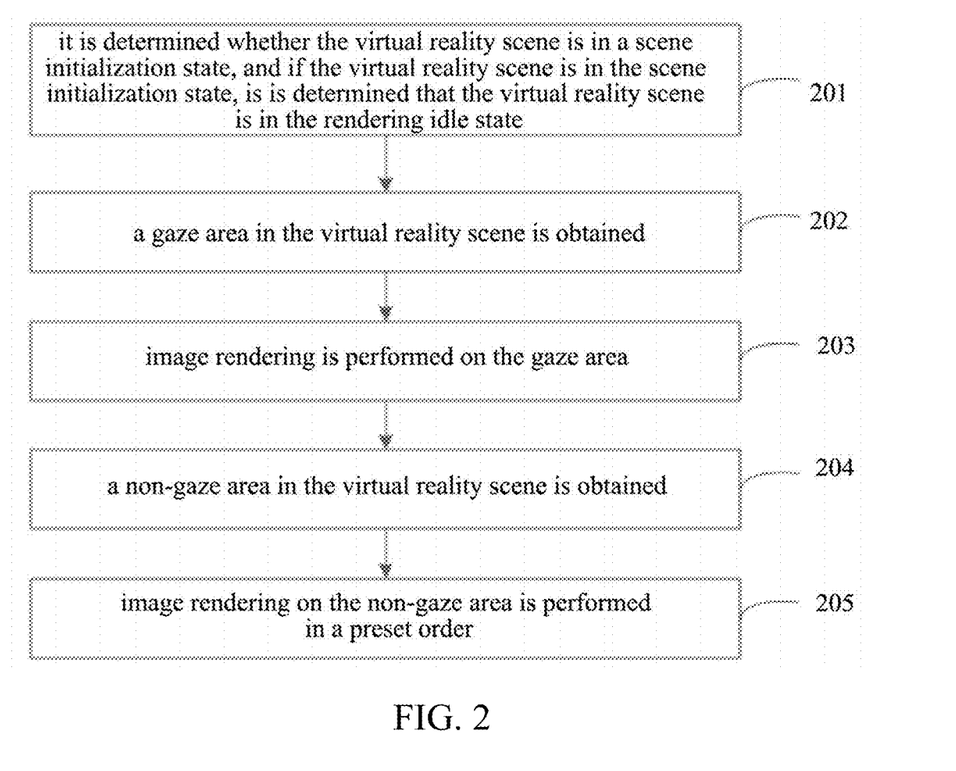
FIG. 2 is a flowchart of another method for rendering a virtual reality scene according to an embodiment of the present disclosure.

FIG. 2 is a flowchart of another method for rendering a virtual reality scene according to an embodiment of the present disclosure. As illustrated in FIG. 2, the method includes the following steps.

At step 201, it is determined whether the virtual reality scene is in a scene initialization state, and if the virtual reality scene is in the scene initialization state, it is determined that the virtual reality scene is in the rendering idle state.

For example, the scene initialization instruction may be obtained, and it is determined that the scene initialization state has remained within a preset time after receiving the initialization instruction. The preset time can be determined based on a large amount of experimental data, or voluntarily set according to requirements, which is not limited herein.

Moreover, the display state of the virtual reality device may be obtained, and if it is known that the current virtual reality device is not displaying a virtual reality scene, it is determined to be in the scene initialization state.

At step 202, a gaze area in the virtual reality scene is obtained.

At step 203, image rendering is performed on the gaze area.

As an example, position and posture information of the user's head can be detected by sensors such as gyroscopes and accelerometers, and the user's fixation point position in the virtual reality scene can be obtained. According to parameters such as the fixation point position, human eyes gaze range, field angle, and screen center, the gaze area is determined.

In the embodiments, the gaze area in the virtual reality scene can be obtained, and image rendering is performed on the gaze area to generate a corresponding display image. For example, the gaze area is rendered in the scene initialization state to generate the display image, and then when the scene initialization is completed and the scene is displayed, the display image corresponding to the gaze area is called for display.

At step 204, a non-gaze area in the virtual reality scene is obtained.

At step 205, image rendering on the non-gaze area is performed in a preset order.

In the embodiments, it is also possible to render non-gaze areas in the virtual reality scene and generate corresponding display images. That is, image rendering on the entire virtual reality scene in the scene initialization state is performed to generate the corresponding display images and store the images, so that when the user uses the virtual reality scene, the display images are called and displayed to increase frame rate and reduce the delay and dizziness.

For example, the distance between the non-gaze area and the center of the screen is obtained, and then the image rendering of the non-gaze area may be performed by staring from the center of the screen, and the corresponding display images are generated.

It is noted that the above sequence of image rendering for the non-gaze area is only exemplary, which is not limited herein.

The application scene for rendering the gaze area and the non-gaze area are described below.

Figure 3:
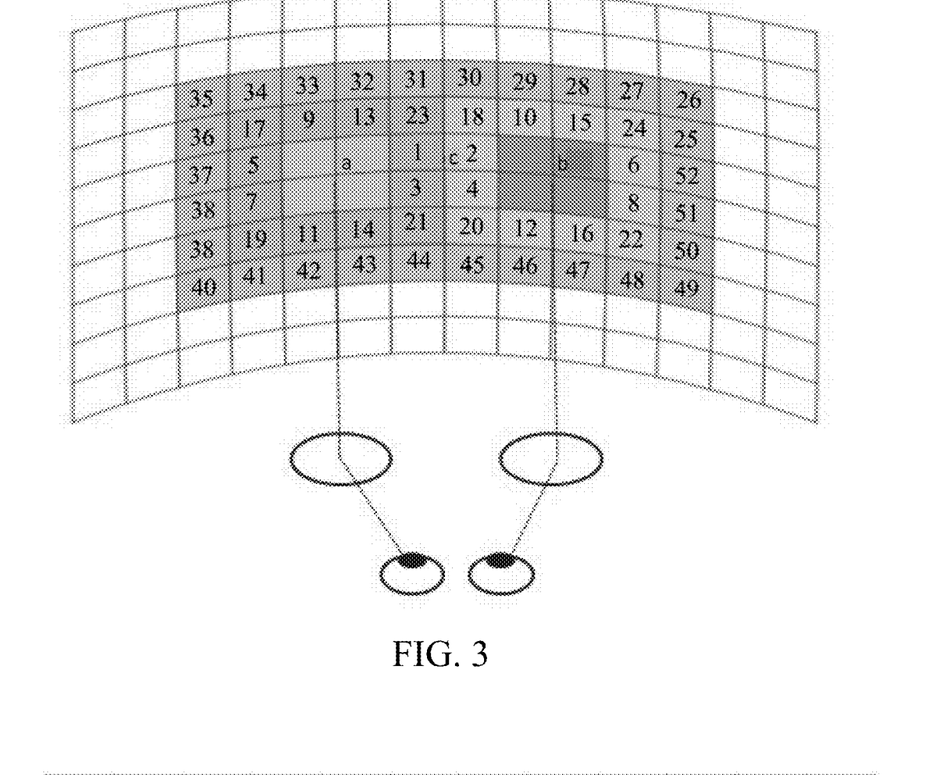
FIG. 3 is a schematic diagram of a virtual reality scene.

As illustrated in FIG. 3, points a and b are fixation points, and point c is an intermediate point of the two fixation points. A coordinate system can be established based on the virtual reality scene area, and the virtual reality scene can be divided into a plurality of areas in the coordinate system, for example, a plurality of square areas in the figures. Through GPU rendering and anti-distortion processing of the virtual reality scene, the display image is displayed to the human eye through lens or display components on the virtual reality device.

Figure 4:
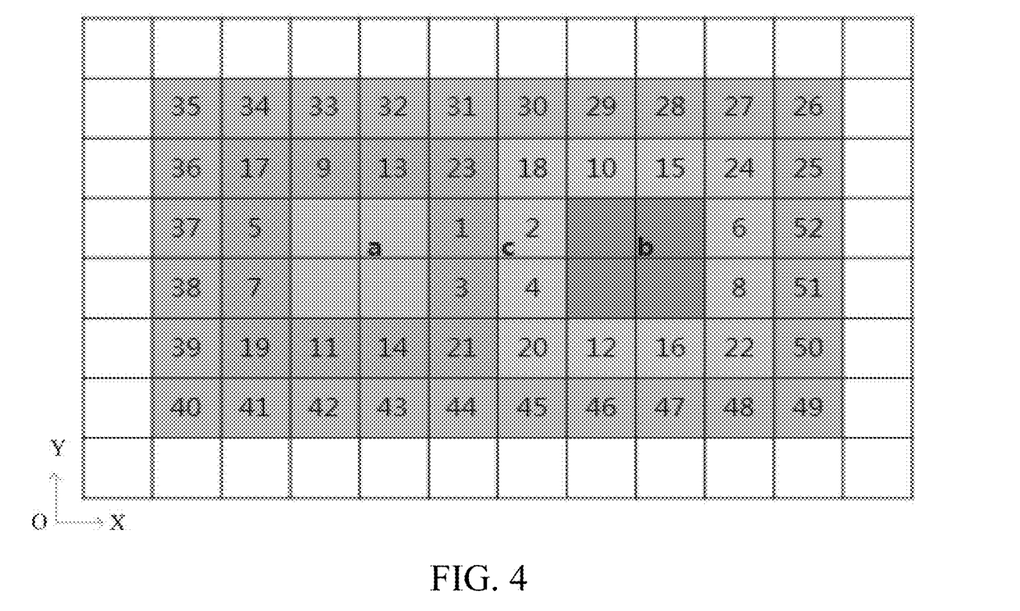
FIG. 4 is a schematic diagram of rendering a virtual reality scene.

As illustrated in FIG. 4, FIG. 4 is a schematic plan view of the virtual reality scene area in FIG. 3. In the figures, a (x1, y1), b (x2, y2) refers to an enclosed area of the range of the left eye fixation area (x1±d, y1±d), and the right eye fixation area (x2±d, y2±d), in which d is the side length of the square area in the figure. When the scene is initialized, image rendering is performed on the gaze area to generate the display image and store the display image. Furthermore, the non-gaze area is sequentially rendered and the display image is stored in the order of the area numbers in the figure from small to large, and then the display image is called when the image of a certain area needs to be displayed. The area numbers in the figures can be determined according to the preset correspondence relation of the data table, and only represent an example of the sequence of rendering the non-gaze area.

It is noted that in the above-mentioned division of the virtual reality scene, the shape, size, and relative position of the gaze area are only examples, and are used to explain the present disclosure, which is not limited herein.

The method for rendering the virtual reality scene according to the embodiments of the present disclosure renders the gaze area and the non-gaze area in the scene initialization state, so that when the user uses the virtual reality scene, the display image is called and displayed to increase the frame rate and reduce the delay and dizziness.

Based on the above embodiments, rendering the virtual reality scene in a scene display state is taken as an example.

Figure 5:
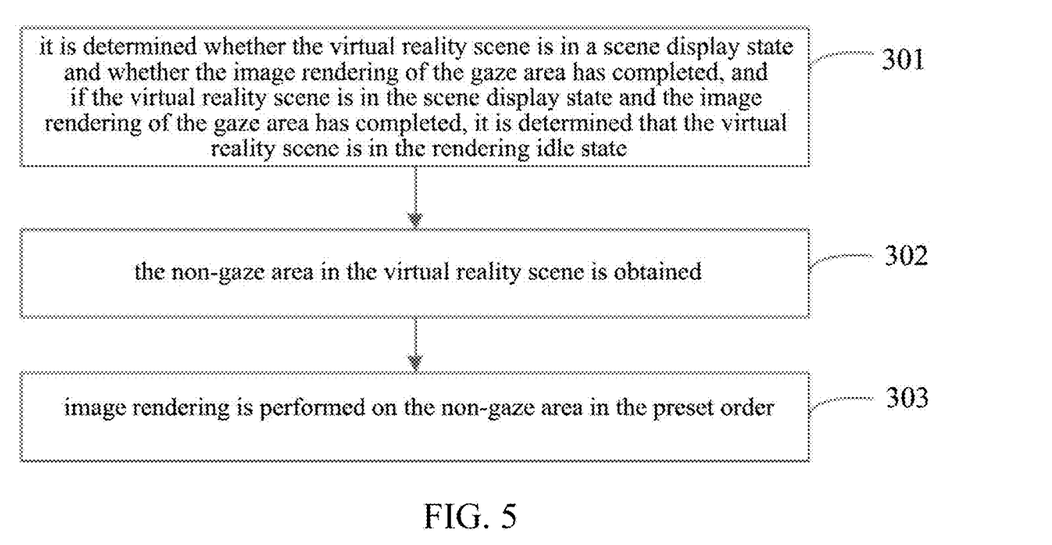
FIG. 5 is a flowchart of yet another method for rendering a virtual reality scene according to an embodiment of the present disclosure.

FIG. 5 is a flowchart of yet another method for rendering a virtual reality scene according to an embodiment of the present disclosure. As illustrated in FIG. 5, the method includes the following steps.

At step 301, it is determined whether the virtual reality scene is in a scene display state and whether the image rendering of the gaze area has completed, and if the virtual reality scene is in the scene display state and the image rendering of the gaze area has completed, it is determined that the virtual reality scene is in the rendering idle state.

For example, the display state of the virtual reality device may be obtained, and if it is known that the current virtual reality device is displaying a virtual reality scene, it is further determined whether image rendering of the current gaze area has completed. If it is known that image rendering of the current gaze area has completed, it is determined that the virtual reality scene is in the rendering idle state.

It is understood that in the related art, the virtual reality scene is rendered in real time by the GPU. In the embodiments, when image rendering of the current gaze area is completed during display, the image rendering of other areas is performed in advance. For example, the virtual reality scene includes areas 1, 2, and 3, and the current gaze area is area 1. When rendering of the area 1 is completed, the area 2 and area 3 are pre-rendered to facilitate calling the pre-rendered display image when displaying other areas to increase the display refresh rate and reduce delay.

At step 302, the non-gaze area in the virtual reality scene is obtained.

At step 303, image rendering is performed on the non-gaze area in the preset order.

It is noted that the explanation of the image rendering of the non-gaze area in the foregoing embodiment is also applicable for this embodiment, which is not be repeated herein.

In some embodiments of the present disclosure, it is also possible to determine whether the position of the gaze area has changed, if it is known that the position of the gaze area has changed, the current image rendering operation is interrupted, the changed gaze area is obtained, and then image rendering is performed on the changed gaze area. For example, when performing image rendering on the gaze area 1 in the scene initialization state, if the position of the gaze area 1 changes, the current image rendering operation on the gaze area 1 is interrupted, and the changed gaze area 2 is acquired, and image rendering of the gaze area 2 is performed.

As a possible implementation, the position of the fixation point may be detected every preset time, and if it is known that the fixation point position changes, it is determined that the fixation area position has changed. Furthermore, the current image rendering process is interrupted, and the gaze area is reacquired, and a corresponding image rendering operation is further performed according to the changed gaze area position.

In some embodiments of the present disclosure, it is also possible to obtain the current area to be rendered and determine whether image rendering of the area to be rendered has completed. If image rendering of the area to be rendered has completed, the area to be rendered is skipped and image rendering is performed on the next area in a preset order. The area to be rendered is an area where image rendering is to be performed in the virtual reality scene. For example, when the gaze area 1 is changed to the gaze area 2, it is necessary to perform image rendering on the gaze area 2 to determine the gaze area 2 as the area to be rendered. Furthermore, it is determined whether the image rendering on the gaze area 2 has completed. When the image rendering of the gaze area 2 has completed, the gaze area 2 is skipped and the next area is acquired in the preset order for image rendering. For example, when the gaze area changes, there may be a situation where the current area to be rendered has been rendered. Therefore, by querying the correspondence between the display image and the display area, the rendered area can be determined to reduce repeated processing and improve processing efficiency.

The following describes the case where the gaze area changes.

Figure 6:
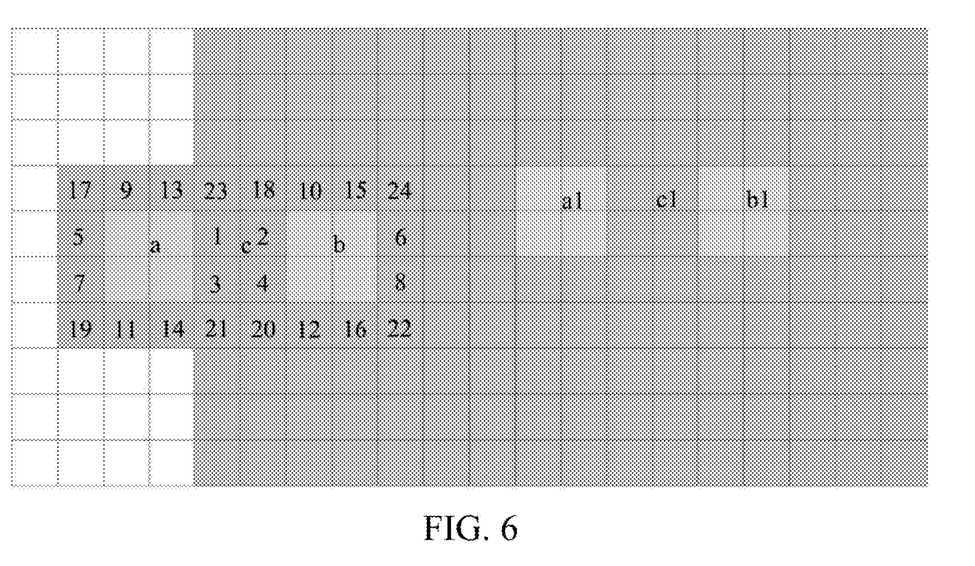
FIG. 6 is another schematic diagram of rendering a virtual reality scene.

As illustrated in FIG. 6, the original fixation area is the area determined according to the fixation points a and b. During the rendering process, the fixation area is changed when the rendering of the current fixation area and the area with numbers in the figure are completed, and interruption is performed according to the procedure, and new fixation points a1 and b1 are obtained to determine the current gaze area. Then rendering of the current fixation area is started. After the current fixation area is rendered, image rendering is successively performed by starting with a center point cl of the new fixation points a1, b1. A scene area that has been rendered is skipped and image rendering is continued according to the current algorithm.

The following will be described in combination with actual application scenarios.

Figure 7:
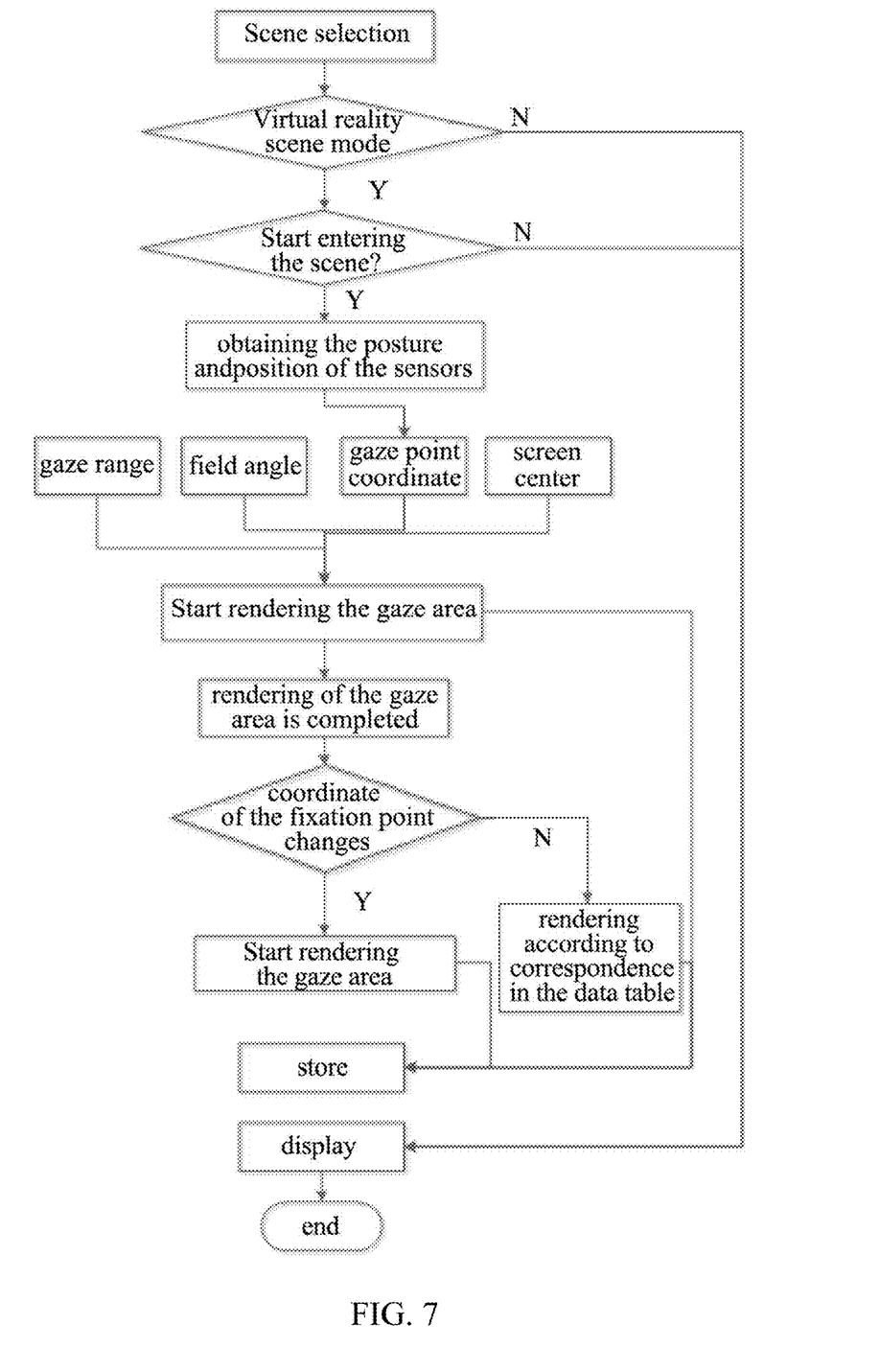
FIG. 7 is a flowchart of an application scenario according to an embodiment of the present disclosure.

As illustrated in FIG. 7, the virtual reality scene is obtained at the beginning, for example, the user's selection instruction is received to select the corresponding virtual reality scene, and when the virtual reality scene is a known virtual reality scene, such as medical and other virtual reality scenes, the next step is executed, otherwise, display the virtual reality scene. When starting to enter the scene, for example, in the scene initialization state, the gaze point coordinates after entering the scene are determined by the postures of the sensors such as the gyroscope and the accelerometer. The gaze area is determined according to the gaze point coordinates, gaze range, field angle, and screen center, in which the gaze range, field angle, and screen center can be obtained from related measurements, otherwise, the virtual reality scene is displayed. Furthermore, image rendering is performed on the gaze area of the virtual reality scene, and when the rendering of the gaze area is completed and the gaze area is unchanged, the image rendering of the non-gaze area is sequentially performed according to correspondence in the preset data table, and the rendered display image is stored. Further, when the gaze area changes, a new gaze area is acquired and the corresponding image rendering operation is performed. When the scene initialization is completed, the virtual reality scene is displayed and the display image stored in the current coordinate system is called for display. Therefore, by rendering the image in the idle rendering state and calling it during display, the problem of limiting the display refresh rate due to the low GPU rendering refresh rate during GPU real-time rendering is solved, thereby increasing the display refresh rate and reducing the delay and the dizziness when using the virtual reality device. Moreover, while improving the display refresh rate, the authenticity of the image is ensured, and by realizing the call to the rendered display image after rendering, power consumption of the device is reduced, and endurance of the device is improved.

In order to realize the above embodiments, the present disclosure further provides an apparatus for rendering a virtual reality scene.

Figure 8:
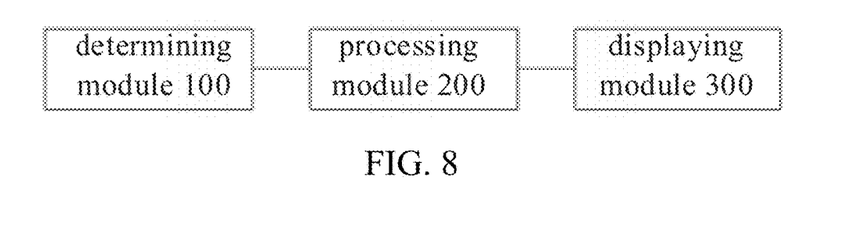
FIG. 8 is a schematic diagram of an apparatus for rendering a virtual reality scene according to an embodiment of the present disclosure.

FIG. 8 is a schematic diagram of an apparatus for rendering a virtual reality scene according to an embodiment of the present disclosure. As illustrated in FIG. 8, the apparatus includes:

a determining circuit 100, configured to obtain a virtual reality scene and determine whether the virtual reality scene is in a rendering idle state;

a processing circuit 200, configured to, if the virtual reality scene is in the rendering idle state, perform image rendering on the virtual reality scene to generate a display image and store a correspondence between the display image and a display area;

a displaying circuit 300, configured to obtain a target area to be displayed of the virtual reality scene, call a target display image corresponding to the target area according to the correspondence and display the target display image.

Figure 9:
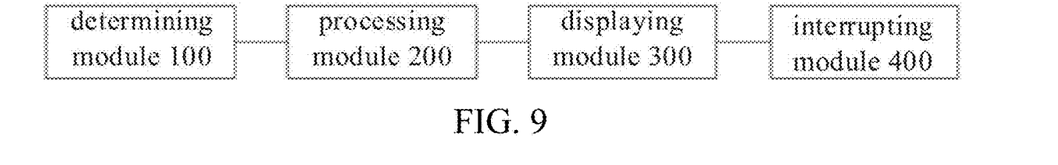
FIG. 9 is a schematic diagram of another apparatus for rendering a virtual reality scene according to an embodiment of the present disclosure.

Based on FIG. 8, the apparatus in FIG. 9 further includes an interrupting circuit 400, configured to, when a position of the gaze area changes, interrupt the image rendering operation, and obtain a gaze area after change; and perform image rendering on the changed gaze area.

Moreover, the determining circuit 100 is further configured to: determine whether the virtual reality scene is in a scene initialization state, and if the virtual reality scene is in the scene initialization state, determine that the virtual reality scene is in the rendering idle state; and the processing circuit 200 is configured to: obtain a gaze area in the virtual reality scene; and perform image rendering on the gaze area.

The processing circuit 200 is configured to: obtain the non-gaze area in the virtual reality scene; and perform image rendering on the non-gaze area in the preset order.

The determining circuit 100 is configured to: determine whether the virtual reality scene is in a scene display state and whether the image rendering of the gaze area has completed, and if the virtual reality scene is in the scene display state and the image rendering of the gaze area has completed, determine that the virtual reality scene is in the rendering idle state.

The processing circuit 200 is configured to: obtain the non-gaze area in the virtual reality scene; and perform image rendering on the non-gaze area in the preset order.

The processing circuit 200 is configured to: obtain an area to be rendered, and determine whether image rendering of the area to be rendered has completed; and if image rendering of the area to be rendered has completed, determine a next area to be rendered according to the area to be rendered, and perform image rendering on the next area to be rendered.

It is noted that the description of the method for rendering the virtual reality scene in the foregoing embodiment is also applicable for the device for rendering the virtual reality scene in this embodiment, which is not repeated herein. The module in the embodiment may be a module with data processing capability and/or program execution capability, including but not limited to one or more of a processor, a single-chip microcomputer, a digital signal process (DSP), an application specific integrated circuit (ASIC) and other devices. For example, it may be a central processing unit (CPU), a field programmable gate array (FPGA), or a tensor processing unit (TPU). Each module may include one or more chips in the above device.

With the apparatus for rendering a virtual reality scene, a virtual reality scene is obtained and it is determined whether the virtual reality scene is in a rendering idle state, if the virtual reality scene is in the rendering idle state, image rendering is performed on the virtual reality scene to generate a display image and store a correspondence between the display image and a display area. Therefore, a target area to be displayed of the virtual reality scene is obtained, a target display image corresponding to the target area is called according to the correspondence and displayed. By rendering images in a rendering idle state and adopting a calling method during display, the problem of limiting a display refresh rate due to low GPU rendering refresh rate is solved, thereby improving the display refresh rate, and reducing the delay and the "dizziness" when using a virtual reality device. Moreover, while improving the display refresh rate, the authenticity of the image is ensured, and by calling the rendered display image, power consumption of the device is reduced, and the endurance of the device is improved.

In order to realize the above embodiments, the present disclosure further provides a virtual reality device including the device for rendering the virtual reality scene as described in any one of the foregoing embodiments.

In order to realize the above embodiments, the present disclosure further provides an electronic device including a processor and a memory, in which the processor runs the program corresponding to the executable program code by reading the executable program code stored in the memory, so as to implement the method for rendering the virtual reality scene as described in any one of the foregoing embodiments.

In order to realize the above embodiments, the present disclosure further provides a computer program product, when the instructions in the computer program product are executed by the processor, the method for rendering the virtual reality scene as described in any of the foregoing embodiments is implemented.

In order to realize the above embodiments, the present disclosure further provides a computer-readable storage medium on which a computer program is stored, when executed by the processor, the method for rendering the virtual reality scene as described in any of the foregoing embodiments is implemented.

Figure 10:
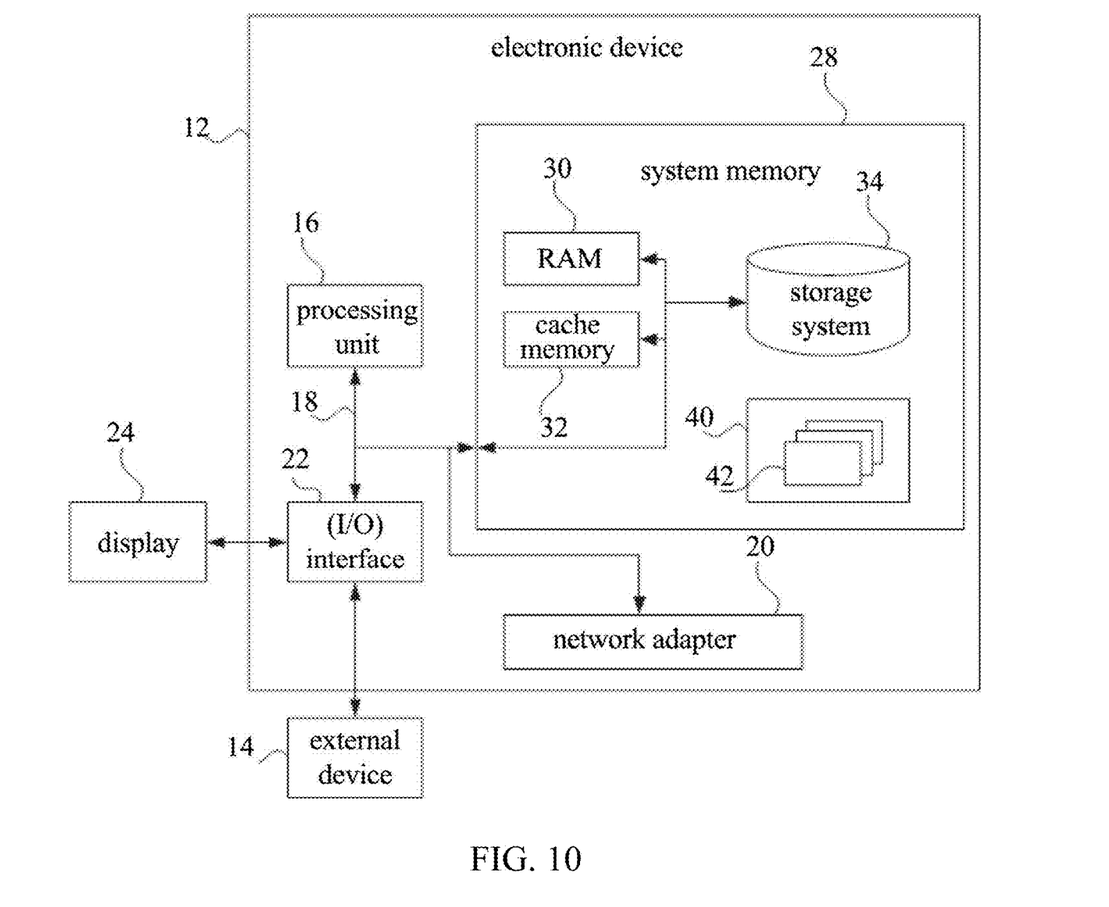
FIG. 10 is a block diagram of an exemplary electronic device for implementing embodiments of the present disclosure.

FIG. 10 is a block diagram of an exemplary electronic device for implementing embodiments of the present disclosure. The electronic device 12 shown in FIG. 10 is only an example, and should not bring any limitation to the functions and use scope of the embodiments of the present disclosure.

As illustrated in FIG. 10, the electronic device 12 is represented in the form of a general-purpose computing device. The components of the electronic device 12 may include, but are not limited to, one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The electronic device 12 typically includes various computer system readable mediums. These mediums may be any usable medium that may be accessed by the electronic device 12, including volatile and non-volatile mediums, removable and non-removable mediums.

The system memory 28 may include computer system readable mediums in the form of volatile medium, such as a RAM (Random Access Memory) 30 and/or a cache memory 32. The electronic device 12 may further include other removable/non-removable, volatile/non-volatile computer system storage mediums. Only as an example, the storage system 34 may be configured to read from and write to non-removable, non-volatile magnetic mediums (not illustrated in FIG. 10, and usually called "a hard disk driver"). Although not illustrated in FIG. 10, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The electronic device 12 may communicate with one or more external devices 14 (such as a keyboard, a pointing device, and a display 24), may further communicate with one or more devices enabling a user to interact with the device, and/or may communicate with any device (such as a network card, and a modem) enabling the electronic device 12 to communicate with one or more other computer devices. Such communication may occur via an Input/Output (I/O) interface 22. Moreover, the computer device 12 may further communicate with one or more networks (such as LAN (Local Area Network), WAN (Wide Area Network) and/or public network, such as Internet) via a network adapter 20. As illustrated, the network adapter 20 communicates with other modules of the electronic device 12 via the bus 18. It should be understood that, although not illustrated, other hardware and/or software modules may be used in combination with the electronic device 12, including but not limited to: microcode, device drivers, redundant processing units, external disk drive arrays, RAID (Redundant Array of Independent Disks) systems, tape drives, and data backup storage systems, etc.

The processing unit 16, by operating programs stored in the system memory 28, executes various function applications and data processing, for example implements the high-precision map generation method provided in embodiments of the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for rendering a virtual reality scene, comprising:
    obtaining a virtual reality scene and determining whether the virtual reality scene is in a rendering idle state;
    if the virtual reality scene is in the rendering idle state, performing image rendering on the virtual reality scene to generate a display image and store a correspondence between the display image and a display area; and
    obtaining a target area to be displayed of the virtual reality scene, calling a target display image corresponding to the target area according to the correspondence and displaying the target display image,
    wherein determining whether the virtual reality scene is in the rendering idle state, comprises:
    determining whether the virtual reality scene is in a scene initialization state, and if the virtual reality scene is in the scene initialization state, determining that the virtual reality scene is in the rendering idle state; or
    determining whether the virtual reality scene is in a scene display state and whether the image rendering of the gaze area has completed, and if the virtual reality scene is in the scene display state and the image rendering of the gaze area has completed, determining that the virtual reality scene is in the rendering idle state.

2. The method according to claim 1, wherein performing image rendering on the virtual reality scene, comprises:
    obtaining a gaze area in the virtual reality scene; and
    performing image rendering on the gaze area.

3. The method according to claim 2, further comprising:
    obtaining a non-gaze area in the virtual reality scene; and
    performing image rendering on the non-gaze area in a preset area order.

4. The method according to claim 2, wherein performing image rendering on the virtual reality scene, comprises:
    obtaining an area to be rendered, and determining whether image rendering of the area to be rendered has completed; and
    if image rendering of the area to be rendered has completed, determining a next area to be rendered according to the area to be rendered, and performing image rendering on the next area to be rendered.

5. The method according to claim 2, wherein performing image rendering on the virtual reality scene to generate the display image and store the correspondence between the display image and the display area, comprises:
    establishing a coordinate system according to the virtual reality scene, and segmenting the virtual reality scene into a plurality of display areas in the coordinate system;
    performing image rendering on the display areas to generate display images; and
    storing the display images and the correspondence between the display image and the display area.

6. The method according to claim 3, further comprising:
    when a position of the gaze area changes, interrupting the image rendering operation, and obtaining a gaze area after change; and
    performing image rendering on the changed gaze area.

7. The method according to claim 3, wherein performing image rendering on the virtual reality scene, comprises:
    obtaining an area to be rendered, and determining whether image rendering of the area to be rendered has completed; and
    if image rendering of the area to be rendered has completed, determining a next area to be rendered according to the area to be rendered, and performing image rendering on the next area to be rendered.

8. The method according to claim 3, wherein performing image rendering on the virtual reality scene to generate the display image and store the correspondence between the display image and the display area, comprises:
    establishing a coordinate system according to the virtual reality scene, and segmenting the virtual reality scene into a plurality of display areas in the coordinate system;
    performing image rendering on the display areas to generate display images; and
    storing the display images and the correspondence between the display image and the display area.

9. The method according to claim 6, wherein performing image rendering on the virtual reality scene, comprises:

obtaining an area to be rendered, and determining whether image rendering of the area to be rendered has completed; and if image rendering of the area to be rendered has completed, determining a next area to be rendered according to the area to be rendered, and performing image rendering on the next area to be rendered.

10. The method according to claim 6, wherein performing image rendering on the virtual reality scene to generate the display image and store the correspondence between the display image and the display area, comprises:

establishing a coordinate system according to the virtual reality scene, and segmenting the virtual reality scene into a plurality of display areas in the coordinate system;

performing image rendering on the display areas to generate display images; and storing the display images and the correspondence between the display image and the display area.

11. The method according to claim 1, wherein performing image rendering on the virtual reality scene, comprises:

obtaining an area to be rendered, and determining whether image rendering of the area to be rendered has completed; and if image rendering of the area to be rendered has completed, determining a next area to be rendered according to the area to be rendered, and performing image rendering on the next area to be rendered.

12. The method according to claim 1, wherein performing image rendering on the virtual reality scene to generate the display image and store the correspondence between the display image and the display area, comprises:

establishing a coordinate system according to the virtual reality scene, and segmenting the virtual reality scene into a plurality of display areas in the coordinate system;

performing image rendering on the display areas to generate display images; and storing the display images and the correspondence between the display image and the display area.

13. A non-transitory computer-readable storage medium on which a computer program is stored, wherein when the program is executed by a processor, the method for rendering a virtual reality scene according to claim 1 is implemented.

14. An apparatus for rendering a virtual reality scene, comprising:

a determining circuit, configured to obtain a virtual reality scene and determine whether the virtual reality scene is in a rendering idle state;

a processing circuit, configured to, if the virtual reality scene is in the rendering idle state, perform image rendering on the virtual reality scene to generate a display image and store a correspondence between the display image and a display area; and a displaying circuit, configured to obtain a target area to be displayed of the virtual reality scene, call a target display image corresponding to the target area according to the correspondence and display the target display image, wherein the determining circuit is further configured to:

determine whether the virtual reality scene is in a scene initialization state, and if the virtual reality scene is in the scene initialization state, determine that the virtual reality scene is in the rendering idle state; or determine whether the virtual reality scene is in a scene display state and whether the image rendering of the gaze area has completed, and if the virtual reality scene is in the scene display state and the image rendering of the gaze area has completed, determine that the virtual reality scene is in the rendering idle state.

15. The apparatus according to claim 14, wherein the processing circuit is configured to:

obtain a gaze area in the virtual reality scene; and perform image rendering on the gaze area.

16. The apparatus according to claim 15, wherein the processing circuit is configured to:

obtain a non-gaze area in the virtual reality scene; and perform image rendering on the non-gaze area in a preset area order.

17. The apparatus according to claim 16, further comprising:

an interrupting circuit, configured to, when a position of the gaze area changes, interrupt the image rendering operation, and obtain a gaze area after change; and perform image rendering on the changed gaze area.

18. The apparatus according to claim 14, wherein the processing circuit is configured to:

obtain an area to be rendered, and determine whether image rendering of the area to be rendered has completed; and if image rendering of the area to be rendered has completed, determine a next area to be rendered according to the area to be rendered, and perform image rendering on the next area to be rendered.

* * * * *